United States Patent
Blakemore et al.

(10) Patent No.: US 10,140,781 B2
(45) Date of Patent: Nov. 27, 2018

(54) VEHICLE WIRELESS INFORMATION SYSTEM

(75) Inventors: Bruce Carvell Blakemore, Washtenaw, MI (US); Allan Roy Gale, Livonia, MI (US); Bala Chander, Canton, MI (US); David W Schultz, Wayne, MI (US); Paul Theodore Momcilovich, Carleton, MI (US); Dale Gilman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 12/424,480

(22) Filed: Apr. 15, 2009

(65) Prior Publication Data

US 2010/0268401 A1    Oct. 21, 2010

(51) Int. Cl.
G07C 1/06 (2006.01)
G07C 5/00 (2006.01)
G06Q 10/06 (2012.01)
G07C 5/08 (2006.01)

(52) U.S. Cl.
CPC ............. *G07C 5/008* (2013.01); *G06Q 10/06* (2013.01); *G07C 5/0866* (2013.01); *G07C 5/0891* (2013.01)

(58) Field of Classification Search
USPC ............................................. 701/22, 29, 211
See application file for complete search history.

(56) References Cited

U.S. PATENT DOCUMENTS

| | | | |
|---|---|---|---|
| 6,285,317 B1 * | 9/2001 | Ong | G01C 21/3635 340/995.2 |
| 6,389,337 B1 * | 5/2002 | Kolls | B60R 25/04 340/439 |
| 6,429,773 B1 | 8/2002 | Schuyler | |
| 6,711,474 B1 | 3/2004 | Treyz et al. | |
| 6,829,475 B1 | 12/2004 | Lee et al. | |
| 6,885,285 B2 * | 4/2005 | Losey | B60H 1/0065 307/10.1 |
| 7,013,205 B1 * | 3/2006 | Hafner | B60L 11/126 180/165 |
| 7,055,340 B2 * | 6/2006 | Umebayashi | B60H 1/00642 236/51 |
| 7,197,278 B2 | 3/2007 | Harwood et al. | |
| 7,289,611 B2 | 10/2007 | Iggulden et al. | |
| 7,308,359 B1 * | 12/2007 | Krull | G01C 21/3655 340/995.14 |
| 7,327,242 B2 * | 2/2008 | Holloway | B60R 25/24 180/170 |
| 7,346,374 B2 | 3/2008 | Witkowski et al. | |
| 7,359,774 B2 * | 4/2008 | Grenn | G07C 5/006 340/438 |
| 7,778,604 B2 * | 8/2010 | Bauman | G07C 9/00309 340/5.61 |

(Continued)

FOREIGN PATENT DOCUMENTS

CN    1785723 A    6/2006
EP    1903445 A1    3/2008

*Primary Examiner* — Redhwan K Mawari
(74) *Attorney, Agent, or Firm* — David Kelley, Esq.; Tung & Associates

(57) ABSTRACT

A vehicle wireless information system includes a vehicle, an onboard vehicle computer provided in the vehicle and at least one external access point adapted to wirelessly access the onboard vehicle computer.

19 Claims, 1 Drawing Sheet

(56) References Cited

U.S. PATENT DOCUMENTS

| | | | |
|---|---|---|---|
| 2002/0111715 A1* | 8/2002 | Richard | B60R 16/0231 701/1 |
| 2003/0206102 A1* | 11/2003 | Joao | B60R 25/102 340/539.1 |
| 2004/0019416 A1* | 1/2004 | Chen | B60R 25/00 701/36 |
| 2004/0093155 A1 | 5/2004 | Simonds et al. | |
| 2005/0170777 A1* | 8/2005 | Harwood | H04L 12/2803 455/41.2 |
| 2005/0182536 A1* | 8/2005 | Doyle | G01R 31/3693 701/31.4 |
| 2006/0095174 A1* | 5/2006 | Sonnenrein | B60R 16/02 701/31.5 |
| 2010/0268401 A1* | 10/2010 | Blakemore | G06Q 10/06 701/2 |
| 2018/0190048 A1* | 7/2018 | Safa-Bakhsh | G06N 7/005 |
| 2018/0190052 A1* | 7/2018 | Zhu | G07C 9/00111 |
| 2018/0190053 A1* | 7/2018 | Wu | G07C 9/00309 |
| 2018/0190054 A1* | 7/2018 | Perez | G07C 9/00309 |
| 2018/0190055 A1* | 7/2018 | Kim | G07C 9/00309 |
| 2018/0190056 A1* | 7/2018 | Desinor, Jr. | G07C 9/00896 |
| 2018/0190057 A1* | 7/2018 | Heinz | G07C 9/00722 |
| 2018/0190127 A1* | 7/2018 | Thoppae | G08G 1/207 |
| 2018/0190133 A1* | 7/2018 | Navot | G05D 1/0676 |
| 2018/0191144 A1* | 7/2018 | Kuroishi | H01B 7/0045 |
| 2018/0191866 A1* | 7/2018 | Nakahara | H04L 67/34 |
| 2018/0191889 A1* | 7/2018 | Gerhardt | H04W 12/08 |
| 2018/0192008 A1* | 7/2018 | Zhou | H04N 7/185 |

\* cited by examiner

VEHICLE WIRELESS INFORMATION SYSTEM

FIELD OF THE INVENTION

The present disclosure relates to vehicles. More particularly, the present disclosure relates to a vehicle wireless information system which facilitates remote wireless access and control of the functional features and systems of a vehicle such as a plug-in hybrid electric vehicle, for example.

BACKGROUND OF THE INVENTION

Vehicles may be one of the most expensive purchases an average consumer makes over the course of his or her lifetime. Although new vehicles may include many conveniences such as GPS navigation systems and high-quality audio systems, the vehicle is normally in a parked state and therefore, the systems of the vehicle are not accessible to the vehicle owner or operator. Moreover, lack of interaction between the vehicle operator and vehicle systems may mean that many of the viewer interfaces between the operator and the systems, unlike most programmable equipment in use today (such as a computer background or screensaver, for example), are static.

Additionally, because vehicle systems are typically powered by a 12-volt lead acid battery, it may be necessary to disable the systems to ensure reliable starting of the vehicle. Consequently, the only time a vehicle operator can use key vehicle systems such as a navigation system, for example, may be during vehicle operation and even then, the interaction between operator and vehicle systems may take place through non-intuitive operator interfaces (due to lack of traditional keyboard or mouse access). In addition, service personnel may be required to purchase specialized equipment in order to access the vehicle diagnostics. This may increase capital costs and reduce the overall diagnostic and service capability of the dealer or service provider due to the limited availability of the specialized equipment required to access the vehicle diagnostics.

Therefore, a vehicle wireless information system which facilitates remote wireless access and control of the functional features and systems of a vehicle is needed.

SUMMARY

The present disclosure is generally directed to a vehicle wireless information system. An illustrative embodiment of the vehicle wireless information system includes a vehicle, an onboard vehicle computer provided in the vehicle and at least one external access point adapted to wirelessly access the onboard vehicle computer.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

The present disclosure is generally directed to a vehicle wireless information system which facilitates remote wireless access and control of the various functions, features and/or systems of a vehicle such as a plug-in hybrid electric vehicle, for example. The vehicle wireless information system enables a high degree of interaction between an operator and the vehicle functions, features and/or systems. In some embodiments, the vehicle wireless information system may be applicable to plug-in hybrid electric vehicles.

The vehicle wireless information system may facilitate remote wireless access and control or operation of the various functions, features and/or systems, such as recorded music, maps, GPS, video, navigation system, CD changer and/or satellite radio, for example and without limitation, of a vehicle. An operator may remotely and wirelessly access and control or operate the selected functions, features and/or systems in the vehicle via a home wireless network, a wireless mobile device, an office wireless network or the Internet, for example and without limitation. In some embodiments, a vehicle service technician may remotely and wirelessly access diagnostic features in the vehicle from a vehicle service center. In some embodiments, an operator may download personal navigational and/or other programming to a data storage device on the onboard vehicle computer to customize operation of the vehicle functions, features and/or systems.

Figure 1:
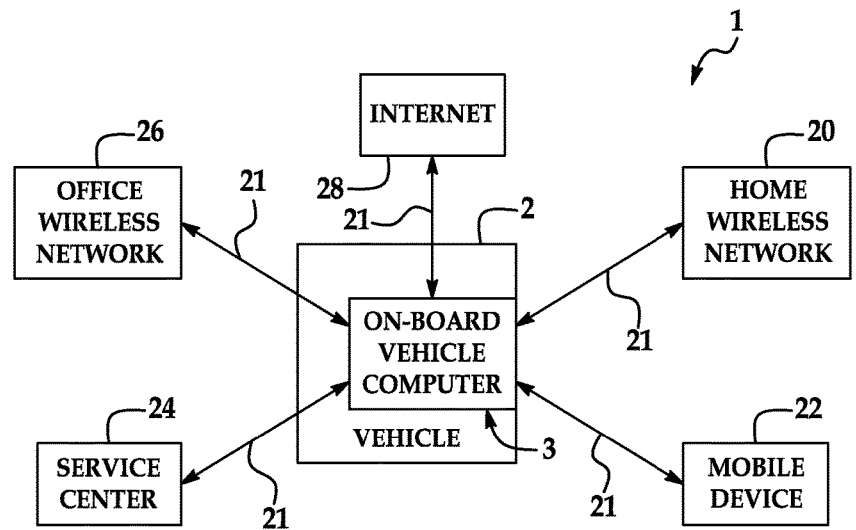
FIG. 1 is a block diagram which illustrates an illustrative embodiment of the vehicle wireless information system.

Referring initially to FIG. 1, an illustrative embodiment of the vehicle wireless information system is generally indicated by reference numeral 1. The vehicle wireless information system 1 may include an onboard vehicle computer 3 provided on a vehicle 2. In some embodiments, the vehicle 2 may be a plug-in hybrid electric vehicle (HEV) or plug-in electric vehicle which receives electrical power for operation from a power grid (not shown). In some embodiments, the vehicle 2 may include an onboard high-voltage battery (not shown) which may include a battery-saver strategy to ensure that sufficient energy remains in the battery after operation of the vehicle wireless information system 1 for starting of the vehicle 2. In some embodiments, the vehicle 2 may be a conventional internal-combustion vehicle having an onboard 12-volt battery (not shown). The conventional vehicle may include a battery-saver strategy to ensure that sufficient energy remains in the battery after operation of the vehicle wireless information system 1 for starting of the vehicle 2.

As will be hereinafter described, the onboard vehicle computer 3 may be adapted to communicate wirelessly with an operator (not shown) and enable the operator to remotely access and operate or control the various functions, features and/or systems of the vehicle 2. The onboard vehicle computer 3 may also be adapted to enable the operator to remotely determine the status of various functions, features and/or systems of the vehicle 2.

The vehicle wireless information system 1 may include at least one external access point 18 from which the onboard vehicle computer 3 may be accessed to operate and control the various functions, features and/or systems of the vehicle 2. The external access point or points 18 may include at least one home wireless network 20; at least one mobile device 22; at least one office wireless network 26; and/or the Internet 28, each of which may be adapted to access the onboard vehicle computer 3 via wireless transmissions 21. The home wireless network 20 may include at least one personal computer (PC); at least one stereo; at least one home theater; and/or at least one telephone, for example and without limitation. The mobile device 22 may include at least one personal digital assistant (PDA); at least one cell phone; at least one mobile web access device; and/or at least one WiFi laptop, for example and without limitation. The office wireless network 26 may include at least one personal computer (PC); at least one telephone; and/or at least one laptop computer, for example and without limitation.

In some embodiments, the external access point or points 18 of the vehicle wireless information system 1 may include a vehicle service center 24 which may be adapted to access the onboard vehicle computer 3 via a wireless transmission 21. Via the vehicle service center 24, a service technician may remotely access and operate or control the various functions, features and/or systems of the vehicle 2. The service technician may determine the status of various vehicle functions, features and/or systems; may perform various diagnostic tasks; and/or may download service or programming information to the onboard vehicle computer 3.

Figure 2:
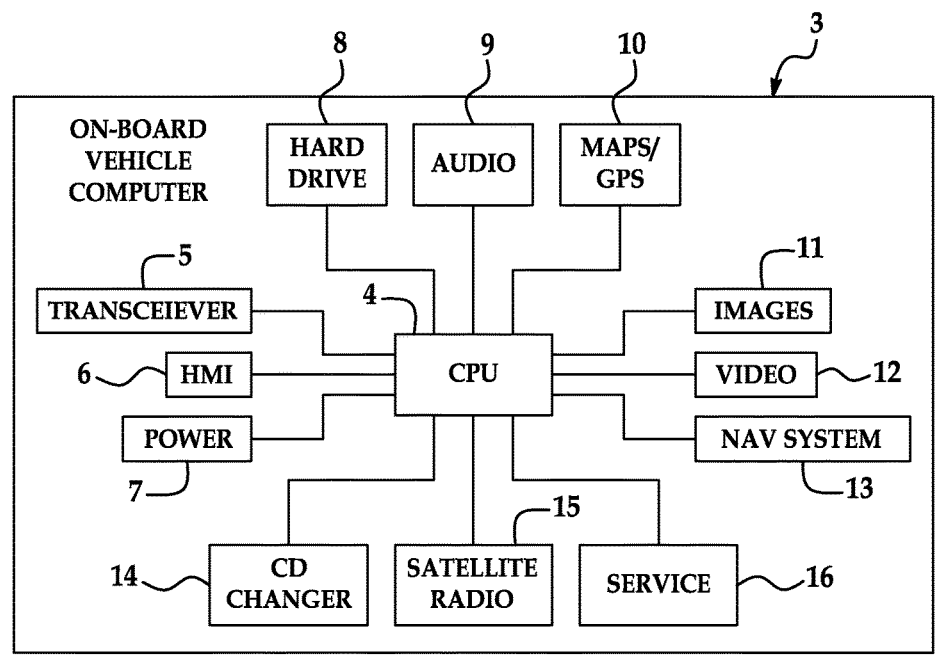
FIG. 2 is a block diagram which illustrates an onboard vehicle computer in implementation of an illustrative embodiment of the vehicle wireless information system.

Referring next to FIG. 2, an illustrative onboard vehicle computer 3 which is suitable for implementation of an illustrative embodiment of the vehicle wireless information system 1 is shown. The onboard vehicle computer 3 may include a CPU 4. A wireless transceiver 5 may interface with the CPU 4. The transceiver 5 may be adapted to receive and transmit the wireless transmissions 21 (FIG. 1) between the onboard vehicle computer 3 and each of the external access points 18. The transceiver 5 may be incorporated with a standard firewall. A Human Machine Interface (HMI) 6 may interface with the CPU 4 and may be provided on a vehicle dashboard (not shown) or other location inside the vehicle 2. The HMI 6 may provide a visual and control interface between an operator (not shown) of the vehicle 2 and the onboard vehicle computer 3. A power source 7, which may be a vehicle battery, for example and without limitation, may be connected to the CPU 4. In some embodiments, a data storage device 8 may interface with the CPU 4 for the downloading and storage of information relating to the various functions of the onboard vehicle computer 3 which will be hereinafter described.

Various functions, features and/or system components of the vehicle 2 may interface with the CPU 4. In some embodiments, an audio component 9 may interface with the CPU 4. The audio component 9 may have the capacity to facilitate audio file storage and remote downloading and playing of the audio files with MP3 functionality (creation of playlist, play by artist, etc.) through audio speakers (not shown) inside the vehicle 2. In some embodiments, the audio component 9 may facilitate the playing of audio files on a PC, a stereo or a home theater system (not shown) which may be part of the home wireless network 20 (FIG. 1).

A maps/GPS component 10 may interface with the CPU 4. The maps/GPS component 10 may have GPS capability and may have the capacity to facilitate storage and remote downloading and presentation of electronic map information on a display (not shown) inside the vehicle 2. An images component 11, a video component 12, a navigation system component 13, an audio player component 14 (such as a CD player or changer, for example and without limitation) and/or a satellite radio component 15 may additionally or alternatively interface with the CPU 4. In some embodiments, a service component 16 may interface with the CPU 4.

The images component 11 may have the capacity to allow image files to be remotely stored and downloaded and may enable an operator to personalize the appearance of the interior of the vehicle 2 using the images. The video component 12 may have the capacity to facilitate the remote downloading and storage of video files and to display the video files on a display (not shown) in the vehicle 2. The navigation system component 13 may have the capacity to facilitate the remote downloading and storage, through the use of navigation software, of navigation data such as program routes; destination lists; points of interest; and/or road construction or other detour information and may facilitate remote operation of a navigation system (not shown) inside the vehicle 2. The audio player component 14 may enable an operator to remotely play, view and/or program a CD changer (not shown) or other audio player in the vehicle 2 and may facilitate the remote uploading and downloading of media relating to operation of the CD changer. The satellite radio component 15 may enable an operator to remotely play, view and/or program a satellite radio (not shown) in the vehicle 2 and may facilitate the remote uploading and downloading of media relating to operation of the of the satellite radio.

The service component 16 may facilitate remote access of service records and operational and performance information of the vehicle 2 by the service center 24 (FIG. 1) as well as remote service diagnostics including full-service access to diagnostic information and vehicle system/mode activation for remote testing. The service component 16 may also facilitate remote downloading of service information or programming to the onboard vehicle computer 3. The audio component 9, video component 12, CD changer 14 and satellite radio 15 may have the capability to stream satellite audio and video without additional subscription or hardware costs to the owner or operator of the vehicle 2. In some embodiments, the service component 16 may have the capability to transmit notifications of routine service requirements such as oil changes, low fuel or tire pressure, thereby allowing an operator better time and vehicle management. The service mode of the vehicle wireless information system 1 may be password-protected and may require that a special key sequence be performed before access is granted. In some embodiments, the onboard vehicle computer 3 may have the capability to transmit service records and other information to the service center 24 via email.

The CPU 4 may have the capability to facilitate remote customization of the preferences for operation of the various components of the vehicle wireless information system 1 which may be displayed on an instrument cluster or navigation screen display, for example and without limitation. The CPU 4 may also be adapted to remotely access and control vehicle functions such as those functions performed by a plug-in electric vehicle. For example, the CPU 4 may be adapted to transmit charge status, programmable charge times and trigger parameters of the vehicle 2. The CPU 4 may have the capability to update software remotely and provide operator access to vehicle parameters such as fuel level, mileage, etc. In some embodiments, the CPU 4 may enable remote climate control and remote start of the vehicle 2 as well as tracking of the vehicle 2 such as via the maps/GPS component 10 of the onboard vehicle computer 3.

In typical application of the vehicle wireless system 1, the onboard vehicle computer 3 can be accessed and the various functions, features and systems of the vehicle 2 (which were heretofore described with respect to FIG. 2) controlled remotely via the wireless transmissions 21 at the external access point or points 18 using the home wireless network 20, the mobile device 22, the service center 24, the office wireless network 26 and/or the Internet 28. Programming and other information for operation of the functions, features and systems of the vehicle 2 may be remotely downloaded onto the data storage device 8 (FIG. 2) of the onboard vehicle computer 3. From the home wireless network 20, the mobile device 22, the service center 24, the office wireless network 26 and/or the Internet 28, the audio component 9; the maps/GPS component 10; the images component 11; the video component 12; the navigation system component 13; the audio player component 14; the satellite radio component 15; and/or the service component 16 may be remotely engaged to implement the functions of those components in the vehicle 2. Alternatively, the components may be engaged to implement the functions in the home wireless network 20, the mobile device 22, the service center 24, the office wireless network 26 or the Internet 28. For example, the audio component 9 may be remotely engaged to play audio from the stored audio files on the speakers (not shown) inside the vehicle 2. Alternatively, the audio may be played on a PC, stereo, home theater (not shown) or on any other suitable audio-playing component of any of the home wireless network 20, the mobile device 22, the service center 24, the office wireless network 26 and the Internet 28. Similarly, by remotely engaging the video component 12 of the onboard vehicle computer 3, the video component 12 may be played on a computer or other video-playing device (not shown) of any of the home wireless network 20, the mobile device 22, the service center 24, the office wireless network 26 and the Internet 28. The service component 16 may be remotely engaged for vehicle diagnostic, programming, service and/or notification purposes. The vehicle system components may be accessed from inside the vehicle 2 via the HMI 6.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle wireless information system, comprising:
   a vehicle;
   an onboard vehicle computer provided in said vehicle;
   at least one external access point configured to wirelessly access said onboard vehicle computer, said wireless access by an operator external to said vehicle, said wireless access by wireless communication between a wireless transceiver onboard said vehicle and said external access point, said wireless transceiver communicatively connected with a vehicle computer central processing unit (CPU), said CPU operationally connected with a plurality of vehicle system components said vehicle system components including components configured to operate and control said vehicle; and,
   wherein said at least one external access point is configured to remotely operate and control via asymmetric communication through said onboard vehicle computer central processing unit (CPU) by said operator at said external access point said plurality of vehicle system components, said remote operation and control including uploading and downloading information respectively to and from said vehicle, said information comprising at least one of streaming video, streaming audio, vehicle operating and diagnostic data, and vehicle component update software, said remote operation and control by said wireless access further comprising remote vehicle start and climate control, said wireless access by direct wireless transmission, said direct wireless transmission comprising wireless communication from said external access point to said wireless transceiver, said external access point comprising a Wi-Fi enabled asymmetric client-server connection comprising at least one of a local area network, a mobile device, and an internet portal;
   said remote operation and control by said wireless access further comprising operation and control by said vehicle system component via asymmetric communication through the external access point of functions of network components, said network component functions comprising operating at least one of video and audio content stored in said vehicle system component.

2. The vehicle wireless information system of claim 1 further comprising a data storage device interfacing with said onboard vehicle computer.

3. The vehicle wireless information system of claim 2 further comprising a human machine interface interfacing with said onboard vehicle computer.

4. The vehicle wireless information system of claim 1 wherein said vehicle comprises an electric vehicle.

5. The vehicle wireless information system of claim 4 wherein said electric vehicle comprises a hybrid electric vehicle.

6. The vehicle wireless information system of claim 5 wherein said hybrid electric vehicle comprises a plug-in hybrid electric vehicle.

7. The vehicle wireless information system of claim 1 wherein said vehicle comprises an internal-combustion vehicle.

8. A vehicle wireless information system, comprising:
   a vehicle;
   an onboard vehicle computer comprising a central processing unit provided in said vehicle and a plurality of vehicle system components connected to said central processing unit; and
   a plurality of external access points configured to wirelessly access said plurality of vehicle system components of said onboard vehicle computer, said wireless access by an operator external to said vehicle, said wireless access by wireless communication between a wireless transceiver onboard said vehicle and said external access points, said wireless transceiver communicatively connected with a vehicle computer central processing unit (CPU)), said CPU operationally connected with a plurality of vehicle system components said vehicle system components including components configured to operate and control said vehicle; and
   wherein said at least one external access point is configured to remotely operate and control via asymmetric communication through said onboard vehicle computer central processing unit (CPU) by said operator at one of said external access points said plurality of vehicle system components, said remote operation and control including uploading and downloading information to and from said vehicle, said information comprising at least one of streaming video, streaming audio, vehicle operating and diagnostic data, and vehicle component update software, said remote operation by said wireless access further comprising remote vehicle start and climate control, said wireless access by direct wireless transmission, said direct wireless transmission comprising wireless communication from said external access point to said wireless transceiver, said external access point comprising a Wi-Fi enabled asymmetrical client-server connection comprising at least one of a local area network, a mobile device, and an internet portal;

said remote operation and control including vehicle system component activation and remote testing of said vehicle system components and vehicle system component activation and control including operation and control by said vehicle system component via asymmetric communication through the external access point of functions of network components communicating through the external access, said network component functions comprising operating at least one of video and audio content stored in said vehicle system component.

9. The vehicle wireless information system of claim 8 further comprising a data storage device interfacing with said onboard vehicle computer.

10. The vehicle wireless information system of claim 9 further comprising a human machine interface interfacing with said onboard vehicle computer.

11. The vehicle wireless information system of claim 8 wherein said vehicle comprises an electric vehicle.

12. The vehicle wireless information system of claim 11 wherein said electric vehicle comprises a hybrid electric vehicle.

13. The vehicle wireless information system of claim 12 wherein said hybrid electric vehicle comprises a plug-in hybrid electric vehicle.

14. The vehicle wireless information system of claim 8 wherein said vehicle comprises an internal-combustion vehicle.

15. The vehicle wireless information system of claim 8 wherein said plurality of external access points comprises at least one of a home wireless network, a mobile device, a service center, an office wireless network and the Internet.

16. A vehicle wireless information system, comprising:
a vehicle;
an onboard vehicle computer comprising a central processing unit (CPU) provided in said vehicle and a data storage device, a wireless transceiver and a plurality of vehicle system components connected to said central processing unit, said central processing unit communicatively connected with a vehicle computer central processing unit (CPU), said CPU operationally connected with a plurality of vehicle system components said vehicle system components including components configured to operate and control said vehicle;
wherein said plurality of vehicle system components further comprises at least one of an audio component, a maps/GPS component, an images component, a video component, a navigation system component, an audio player component, a satellite radio component and a vehicle service component; and
at least one external access point external to said vehicle configured to wirelessly access and remotely operate and control through said onboard vehicle computer central processing unit (CPU) by an operator at said external access point said plurality of vehicle system components of said onboard vehicle computer, said remote operation and control including uploading and downloading information respectively to and from said vehicle, said information comprising at least one of streaming video, streaming audio, vehicle operating and diagnostic data, and vehicle component update software, said wireless access by wireless communication between a wireless transceiver onboard said vehicle and said external access point, said remote operation and control by said wireless access further comprising remote vehicle start and climate control, said wireless access by direct wireless transmission, said direct wireless transmission comprising wireless communication from said external access point to said wireless transceiver, said external access point comprising a Wi-Fi enabled asymmetrical client-server connection comprising at least one of a local area network, a mobile device, and an internet portal;
said remote operation and control by said wireless access further comprising operation and control by said vehicle system component via asymmetric communication through the external access point of functions of network components, said network component functions comprising operating at least one of video and audio content stored in said vehicle system component.

17. The vehicle wireless information system of claim 16 wherein said at least one external access point comprises at least one of a home wireless network, a mobile device, a service center, an office wireless network and the Internet.

18. The vehicle wireless information system of claim 16 further comprising a human machine interface interfacing with said central processing unit of said onboard vehicle computer.

19. The vehicle wireless information system of claim 16 wherein said vehicle is an electric vehicle, a hybrid electric vehicle, a plug-in hybrid electric vehicle or an internal combustion vehicle.

* * * * *